United States Patent
Chin et al.

(10) Patent No.: US 12,499,655 B2
(45) Date of Patent: Dec. 16, 2025

(54) IMAGE DETECTION AUXILIARY SYSTEM AND IMAGE DETECTION METHOD

(71) Applicant: ASUSTeK COMPUTER INC., Taipei (TW)

(72) Inventors: Yun-Jhih Chin, Taipei (TW); Shu-Chiao Liao, Taipei (TW); Jia-En Lee, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 471 days.

(21) Appl. No.: 18/060,078

(22) Filed: Nov. 30, 2022

(65) Prior Publication Data

US 2024/0029401 A1    Jan. 25, 2024

(30) Foreign Application Priority Data

Jul. 22, 2022    (TW) .................. 111127652

(51) Int. Cl.
   *G06V 10/764*    (2022.01)
   *G06T 7/11*    (2017.01)
   *G06V 10/26*    (2022.01)

(52) U.S. Cl.
   CPC .......... *G06V 10/764* (2022.01); *G06T 7/11* (2017.01); *G06V 10/26* (2022.01); *G06T 2207/20132* (2013.01)

(58) Field of Classification Search
   CPC ...... G06V 10/764; G06V 10/26; G06V 10/82; G06V 10/993; G06V 10/25; G06T 7/11; G06T 7/10; G06T 2207/20132
   See application file for complete search history.

(56) References Cited

U.S. PATENT DOCUMENTS 7,574,131 B2 * 8/2009 Chang ................. G03B 37/00
                                                   396/322
9,282,235 B2 * 3/2016 Lindskog ............. G03B 13/36
                         (Continued)

FOREIGN PATENT DOCUMENTS

CN    109963072 B    3/2021
CN    112784843 A    5/2021
                         (Continued)

OTHER PUBLICATIONS

Koyun, Onur Can, et al. "Focus-and-Detect: A small object detection framework for aerial images." Signal Processing: Image Communication 104 (May 2022): 116675. (Year: 2022).*

(Continued)

*Primary Examiner* — Henok Shiferaw
*Assistant Examiner* — Toluwani Mary-Jane Ijaseun
(74) *Attorney, Agent, or Firm* — McClure, Qualey & Rodack, LLP

(57) ABSTRACT

Disclosed are an image detection auxiliary system and an image detection method. An image capture device is used to generate an original image. A computing device receives the original image and preprocesses the original image as an input image. The computing device uses a classification model to obtain a feature parameter corresponding to the input image, and inputs the feature parameter to a probability function to calculate an image focus score. Finally, the computing device performs formal detection or subsequent processing of generating a second warning signal according to the image focus score.

13 Claims, 11 Drawing Sheets

(56) References Cited

U.S. PATENT DOCUMENTS

| | | | |
|---|---|---|---|
| 10,740,887 B2* | 8/2020 | Greenway, Jr. | G06T 7/0002 |
| 10,977,509 B2* | 4/2021 | Feng | G06T 7/0002 |
| 11,170,545 B2* | 11/2021 | Chandarana | G06T 7/0012 |
| 11,270,150 B2 | 3/2022 | Chen et al. | |
| 2018/0350106 A1* | 12/2018 | Kasilya Sudarsan | H04N 23/633 |
| 2020/0036889 A1* | 1/2020 | Udayakumar | H04N 23/635 |
| 2020/0104567 A1* | 4/2020 | Tajbakhsh | G06V 40/165 |
| 2022/0044438 A1* | 2/2022 | Liu | G06T 7/75 |
| 2022/0147749 A1* | 5/2022 | Beach | G06V 10/70 |
| 2022/0180625 A1* | 6/2022 | Ahn | G06T 1/20 |

FOREIGN PATENT DOCUMENTS

| | | | | |
|---|---|---|---|---|
| CN | 113709353 A | 11/2021 | | |
| CN | 113869211 A | 12/2021 | | |
| WO | WO-2021062536 A1 * | 4/2021 | | B25J 19/023 |

OTHER PUBLICATIONS

Yang, Samuel J., et al. "Assessing microscope image focus quality with deep learning." BMC bioinformatics 19.1 (2018): 77. (Year: 2018).*

Bonnard, Jonathan, et al. "On building a CNN-based multi-view smart camera for real-time object detection." Microprocessors and Microsystems 77 (2020): 103177. (Year: 2020).*

* cited by examiner

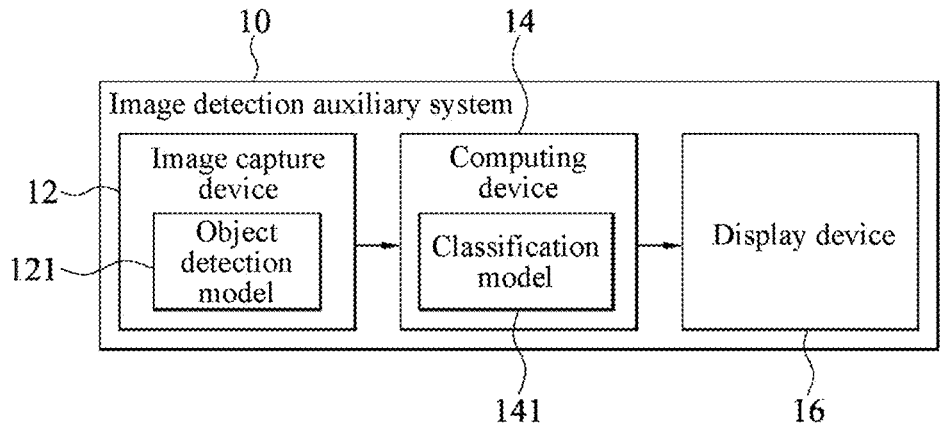
FIG. 1
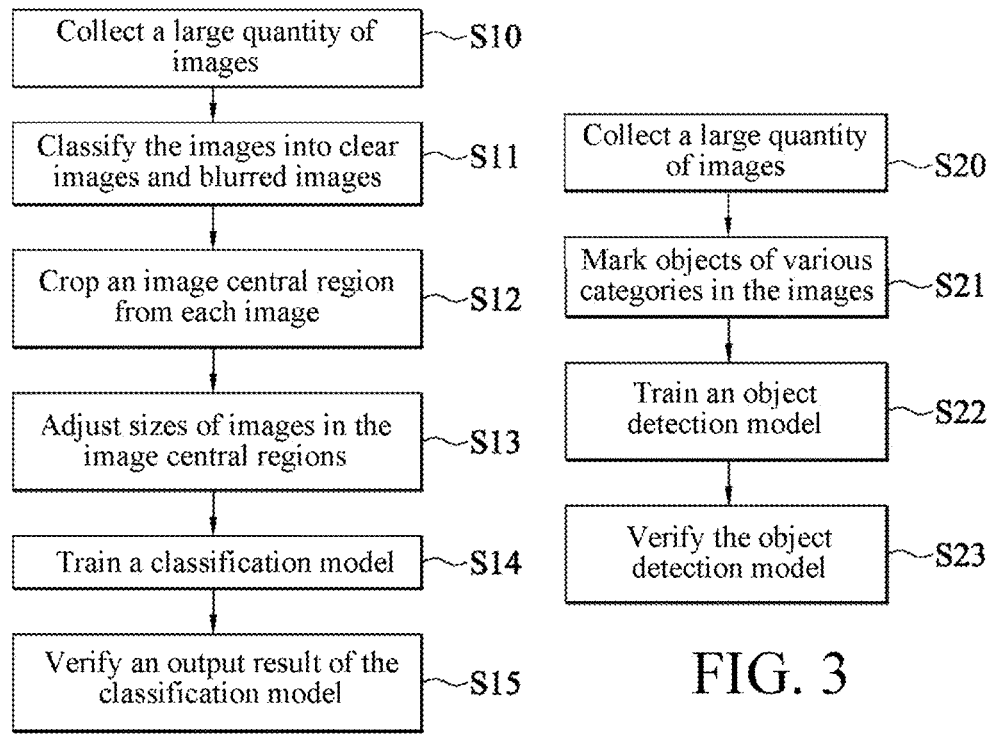
FIG. 2
FIG. 3

IMAGE DETECTION AUXILIARY SYSTEM AND IMAGE DETECTION METHOD

CROSS-REFERENCE TO RELATED APPLICATION

This application claims the priority benefit of Taiwan application serial No. 111127652, filed on Jul. 22, 2022. The entirety of the above-mentioned patent application is hereby incorporated by reference herein and made a part of the specification.

BACKGROUND OF THE INVENTION

Field of the Invention

The disclosure relates to an image detection auxiliary system for determining image definition and an image detection method.

Description of the Related Art

Generally, during object detection such as surface defect detection, a surface image of an object to be detected needs to be clearly captured to determine whether the object to be detected is good.

For target capture of the object to be detected, a bracket is erected to fix positions of the object to be detected and a camera, and an image capture range is set to detect an image to be detected. If a fixing manner changes, the capture range needs to be readjusted. After the image is captured, whether the image is in focus needs to be further determined. Evaluation indicators of images are broad. There are different evaluation standards from different perspectives, and the evaluation standards are divided into subjective evaluation indicators and objective evaluation indicators.

Subjective evaluation usually means that an evaluator determines by human eyes whether the object to be detected in the image is sufficiently clear to be detected, but the manner of determining image definition by human eyes is easily affected by human factors, which leads to different standards of evaluation results. Objective evaluation of images is divided into three types: full-reference, reduced-reference, and no-reference. The full-reference evaluation manner is to calculate a difference between the image to be detected and a reference image to obtain an evaluation score. The reduced-reference evaluation manner is to calculate and compare the image to be detected and a reference image feature to obtain an evaluation score. The no-reference evaluation manner is to use a no-reference image detection algorithm to calculate and obtain an evaluation result of the image to be detected. No matter which manner is used, an algorithm or a specific rule of the manner is needed.

BRIEF SUMMARY OF THE INVENTION

According to the first aspect of this disclosure, an image detection auxiliary system is provided. The image detection auxiliary system includes an image capture device and a computing device. The image capture device captures at least one object to be detected to generate an original image. The computing device is in signal connection to the image capture device to receive the original image, and preprocesses the original image as an input image. The computing device uses a classification model to obtain a feature parameter corresponding to the input image and inputs the feature parameter to a probability function to calculate an image focus score. The computing device performs subsequent processing according to the image focus score.

According to the second aspect of this disclosure, an image detection method is provided. The image detection method includes: capturing at least one object to be detected to generate an original image; preprocessing the original image as an input image; using a classification model to obtain a feature parameter corresponding to the input image; inputting the feature parameter to a probability function to calculate an image focus score; and performing subsequent processing according to the image focus score.

In conclusion, in the image detection auxiliary system and the image detection method in the disclosure, whether a target object is sufficiently clear is detected in advance, and an image focus score for a real-time image is provided, so that a unified evaluation standard is provided for focus results, to avoid different human evaluation standards. In addition, in the disclosure, image capture is performed after it is determined that a target object to be detected is in a capture region, to ensure that a preprocessed image includes the target object to be detected. Moreover, the disclosure has advantages such as assisting a user in automatically filtering out an image captured by mistake, and evaluating focus quality without generating an edge image.

BRIEF DESCRIPTION OF THE DRAWINGS

FIG. 1 is a schematic block diagram of an image detection auxiliary system according to an embodiment of the disclosure.

FIG. 2 is a schematic flowchart of training a classification model according to an embodiment of the disclosure.

FIG. 3 is a schematic flowchart of training an object detection model according to an embodiment of the disclosure.

DETAILED DESCRIPTION OF THE EMBODIMENTS

Figure 4:
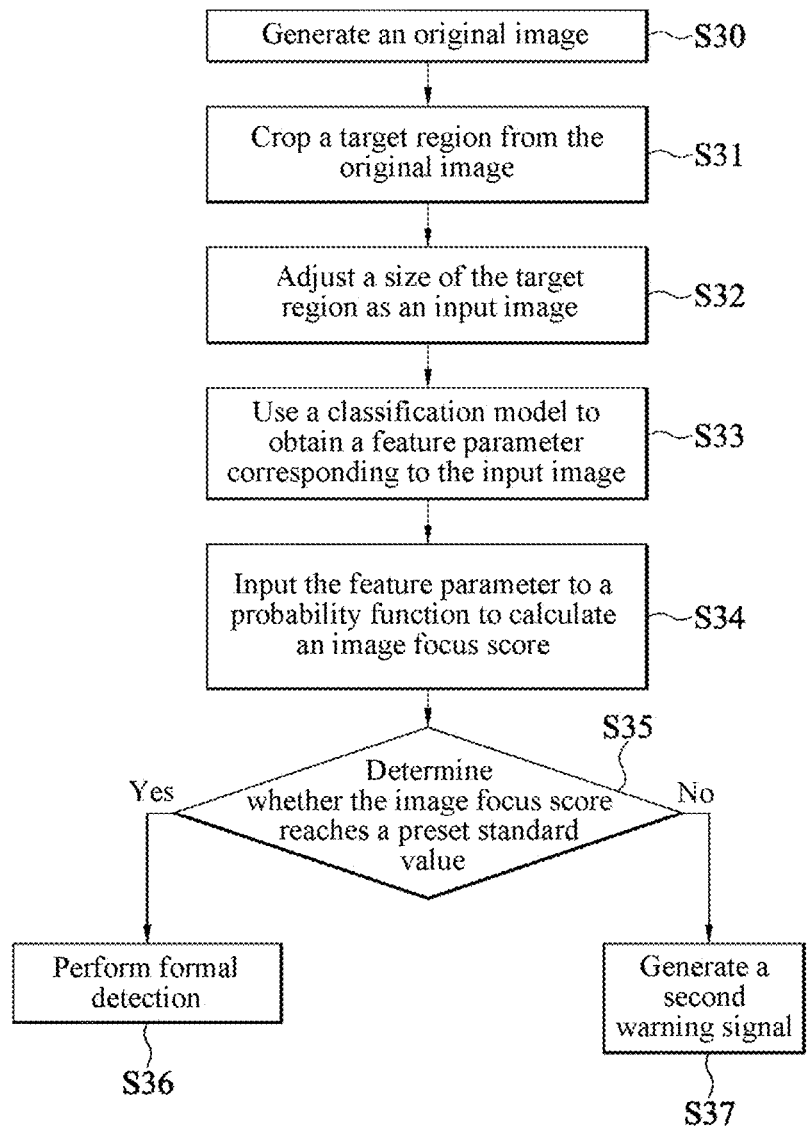
FIG. 4 is a schematic flowchart of an image detection method according to an embodiment of the disclosure.

Exemplary embodiments are provided below for detailed description. However, the embodiments are merely used as examples for description, and do not limit the protection scope of the disclosure. In addition, some elements are omitted in the drawings in the embodiments, to clearly show technical features of the disclosure. The same reference numeral is used to indicate the same or similar elements in all of the drawings.

Referring to FIG. 1, an image detection auxiliary system 10 includes an image capture device 12, a computing device 14, and a display device 16. The image capture device 12 captures at least one object to be detected to generate and output an original image. The computing device 14 is in signal connection to the image capture device 12 in a wired or a wireless connection manner, so that the original image captured by the image capture device 12 is transmitted to the computing device 14. After receiving the original image from the image capture device 12, the computing device 14 preprocesses the original image as an input image. The computing device 14 uses a classification model 141 to obtain a feature parameter corresponding to the input image and inputs the feature parameter to a probability function to calculate an image focus score. The computing device 14 performs subsequent processing according to the image focus score. The display device 16 is electrically connected to the computing device 14, and configured to display the input image and the image focus score or an evaluation result for reference of a user.

In an embodiment, the image capture device 12 is a mobile phone, a camera, a digital camera, or another electronic device that captures an image.

In an embodiment, the computing device 14 is a computer host or another electronic device that performs computation independently to be used with the display device 16. In another embodiment, in the disclosure, a notebook computer is directly used to replace functions of the computing device 14 and the display device 16, so that the notebook computer is responsible for work of both the computing device 14 and the display device 16.

In an embodiment, in the disclosure, a target object is detected in advance, and capture is performed after it is determined that a target object to be detected is in a capture region. Referring to FIG. 1, in the image detection auxiliary system 10, before generating the original image, the image capture device 12 further performs an object detection procedure. The object detection procedure includes: The image capture device 12 detects whether at least one target object exists in a picture of the image capture device 12 through an object detection model 121. In a case that the target object exists in the picture of the image capture device 12, the image capture device 12 directly generates the original image to the computing device 14. Otherwise, in a case that the target object does not exist in the picture of the image capture device 12, the image capture device 12 generates a first warning signal to display a warning that the target object is not detected to remind the user. The user further selects whether to filter out the picture.

In an embodiment, the classification model 141 in the computing device 14 is a deep learning classification model, which is a trained neural network model. The classification model is trained by using a large quantity of images based on the neural network model, to perform computation by using a characteristic that the neural network model learns a relationship between the input image and an output result. The computing device 14 uses the classification model 141 for classification determining, so that the classification model 141 obtains an image feature of the input image for subsequent determining of image definition. Similarly, the object detection model 121 used in the image capture device 12 is a deep learning classification model, and is also trained by using a large quantity of images through a same or similar model.

In an embodiment, a training process of the classification model 141 is shown in steps S10 to S15 of FIG. 2. Referring to FIG. 2, as shown in step S10, a large quantity of images are collected. As shown in step S11, the images are classified into clear images and blurred images. As shown in step S12, an image central region is cropped from each image (including a clear image and a blurred image). As shown in step S13, sizes of images in the image central region are adjusted to unify size specifications of all images as image data for subsequent training and verification. As shown in step S14, the classification model is trained according to the image data. As shown in step S15, an output result of the classification model is verified to optimize the classification model. The classification model 141 trained in step S10 to step S15 is installed in the computing device 14 for computation in the disclosure.

In an embodiment, a training process of the object detection model 121 is shown in steps S20 to S23 of FIG. 3. Referring to FIG. 3, as shown in step S20, a large quantity of images are collected. As shown in step S21, objects of various categories in the images are marked. As shown in step S22, the object detection model is trained according to the marked image data. As shown in step S23, the object detection model is verified to optimize the object detection model. The object detection model 121 trained in step S20 to step S23 is installed in the image capture device 12 for detection in the disclosure.

Referring to FIG. 1 and FIG. 4 together, during the image detection auxiliary system 10 performing an image detection method, a detailed procedure is shown in steps S30 to S37. First, as shown in step S30, the image capture device 12 captures at least one object to be detected to generate an original image and transmits the original image to the computing device 14. As shown in step S31, the computing device 14 crops a target region from the original image. In this embodiment, the target region is a central region of the original image. As shown in step S32, the computing device 14 adjusts a size of the target region as an input image. Step S31 and step S32 are detailed steps of the computing device 14 preprocessing the original image. Then, as shown in step S33, the computing device 14 uses the built-in classification model 141 to obtain a feature parameter corresponding to the input image. As shown in step S34, the computing device 14 inputs the feature parameter to a probability function such as a softmax probability function to calculate an image focus score. In an embodiment, the image focus score is an image definition score. As shown in step S35, the computing device 14 determines whether the image focus score reaches a preset standard value. In a case that the image focus score reaches the preset standard value, as shown in step S36, the computing device 14 performs formal detection on the input image. In an embodiment, the formal detection includes surface defect detection, image classification processing, or image segmentation processing. In a case that the image focus score is lower than the preset standard value, as shown in step S37, the computing device 14 generates a second warning signal to warn that the image focus score does not meet a standard. In an embodiment, the second warning signal is displayed on the display device 16 in a text manner or reminds the user in a sound manner.

Figure 5:
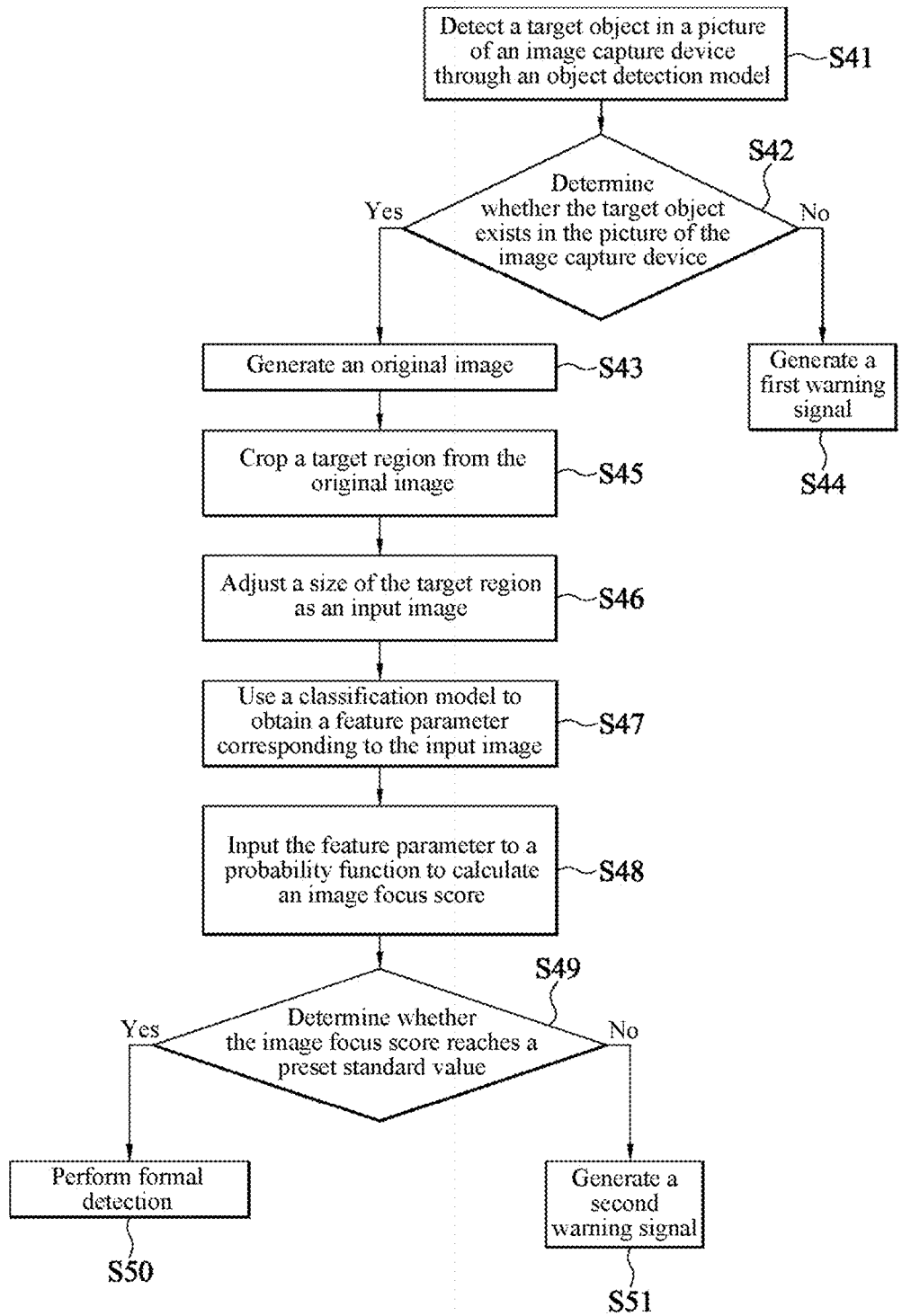
FIG. 5 is a schematic flowchart of another image detection method according to another embodiment of the disclosure.

In another embodiment, in the disclosure, before the image of the object to be detected is captured, an object detection function is used to determine whether the target object exists. Referring to FIG. 1 and FIG. 5 together, during the image detection auxiliary system 10 performing an image detection method, a detailed procedure is shown in steps S41 to S51. First, as shown in step S41 and step S42, the image capture device 12 detects a target object in a picture of the image capture device 12 through the object detection model 121, and determines whether the target object exists in the picture of the image capture device 12. In a case that the target object exists in the picture of the image capture device 12, as shown in step S43, the image capture device 12 captures a target object image of an object to be detected to generate an original image, and transmits the original image to the computing device 14. In a case that the target object does not exist in the picture of the image capture device 12, as shown in step S44, the image capture device 12 generates a first warning signal to display a warning that the target object is not detected to remind the user. After the original image is generated as shown in step S43, as shown in step S45, the computing device 14 crops a target region from the original image. In this embodiment, the target region is a region in which the target object is located. As shown in step S46, the computing device 14 adjusts a size of the target region as an input image. Then, as shown in step S47, the computing device 14 uses the built-in classification model 141 to obtain a feature parameter corresponding to the input image. As shown in step S48, the computing device 14 inputs the feature parameter to a probability function such as a softmax probability function to calculate an image focus score. As shown in step S49, the computing device 14 determines whether the image focus score reaches a preset standard value. In a case that the image focus score reaches the preset standard value, as shown in step S50, the computing device 14 performs formal detection on the input image. In a case that the image focus score is lower than the preset standard value, as shown in step S51, the computing device 14 generates a second warning signal to warn that the image focus score does not meet a standard.

Referring to FIG. 1, FIG. 4, and FIG. 5, for whether the image detection method of FIG. 4 or the image detection method of FIG. 5, when the second warning signal is generated (step S37 of FIG. 4 or step S51 of FIG. 5), after the user is reminded that the image focus score does not meet the standard, the user learns that focus of the image capture device 12 is problematic. It indicates that focus adjustment of the image capture device 12 is not clear. Based on this, the user further manually adjusts a focus parameter of the image capture device 12 or makes the image capture device 12 automatically readjust subsequent processing on the focus parameter.

Figure 6A:
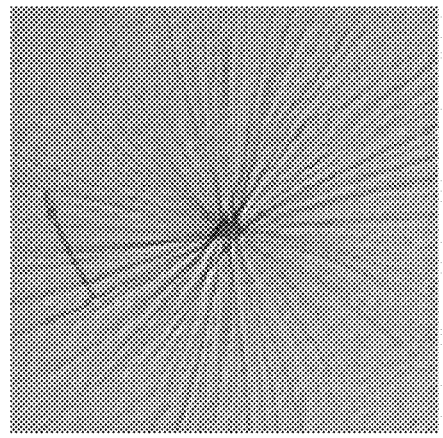
FIG. 6A is a schematic diagram of a used original image without a target object according to the disclosure.
Figure 6B:
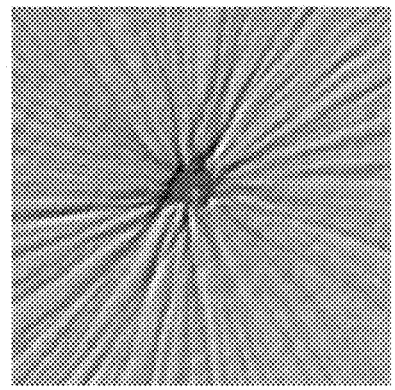
FIG. 6B is a schematic diagram of a cropped target region according to the disclosure.
Figure 6C:
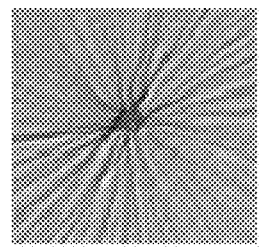
FIG. 6C is a schematic diagram of an input image whose size is adjusted according to the disclosure.

Referring to FIG. 1 and FIG. 6A to FIG. 6C together, which are actual image examples during the computing device 14 preprocessing an original image without a target object, the image capture device 12 generates the original image, as shown in FIG. 6A. The computing device 14 crops a central region from the original image, as shown in FIG. 6B, as a target region. The computing device 14 then adjusts a size of the target region, and uses an image with the adjusted size as an input image, as shown in FIG. 6C, for subsequent evaluation of image definition.

Figure 7A:
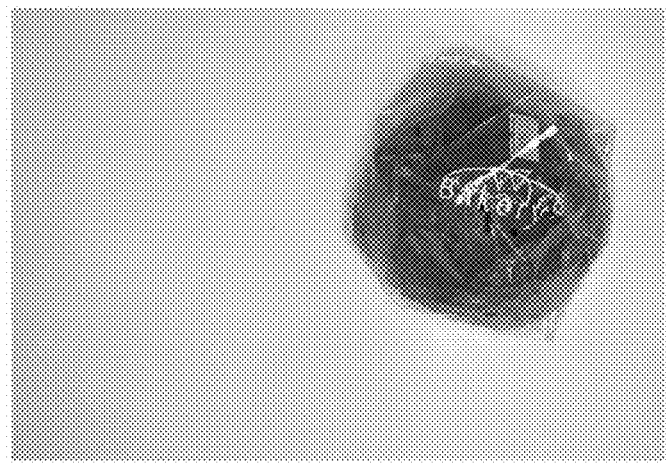
FIG. 7A is a schematic diagram of a used original image with a target object according to the disclosure.
Figure 7B:
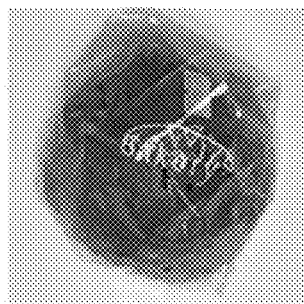
FIG. 7B is a schematic diagram of a cropped target region according to the disclosure.
Figure 7C:
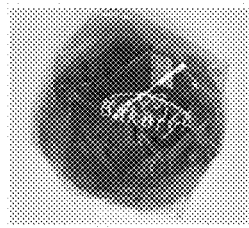
FIG. 7C is a schematic diagram of an input image whose size is adjusted according to the disclosure.

Referring to FIG. 1 and FIG. 7A to FIG. 7C together, which are actual image examples during the computing device 14 preprocessing an original image with a target object, the image capture device 12 generates the original image, as shown in FIG. 7A. The computing device 14 crops a target region with the target object from the original image, as the target region shown in FIG. 7B. The computing device 14 then adjusts a size of the target region, and uses an image with the adjusted size as an input image, as shown in FIG. 7C, for subsequent evaluation of image definition.

Referring to FIG. 8A to FIG. 8F, a streaming image applied to a digital camera is used as a specific example to describe an evaluation result of an image quality score in the disclosure. In an example of streaming image focus, a current streaming image 20 and a historical focus score recording graph 22 obtained after images in a streaming process are evaluated in the disclosure are displayed on the display device 16, and an upper left corner of the historical focus score recording graph 22 indicates an evaluation result 24 whether an image focus score of the current streaming image 20 passes an evaluation standard (a preset standard value). In an embodiment, the preset standard value is set to 60. In a case that the image focus score reaches the preset standard value, it indicates that the image focus score passes the evaluation standard, and the evaluation result 24 displayed on the display device 16 is the word "PASS". In a case that the image focus score is lower than the preset standard value, it indicates that the image focus score fails to pass the evaluation standard, and the evaluation result 24 displayed on the display device 16 is the word "FAIL".

Figure 8A:
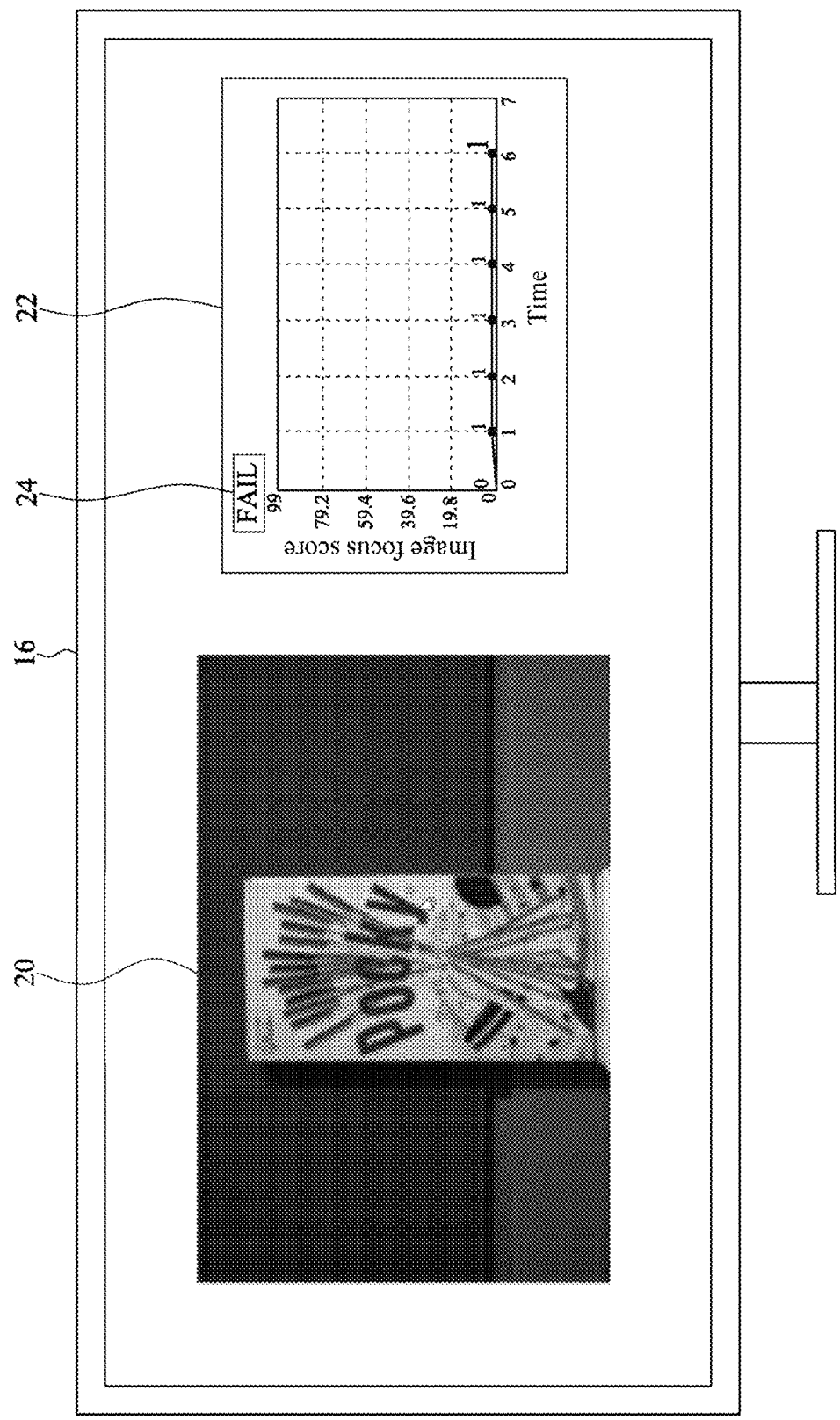
FIG. 8A to FIG. 8F are respectively schematic picture diagrams of current streaming images and recording graphs of historical focus scores at different time points according to the disclosure.
Figure 8B:
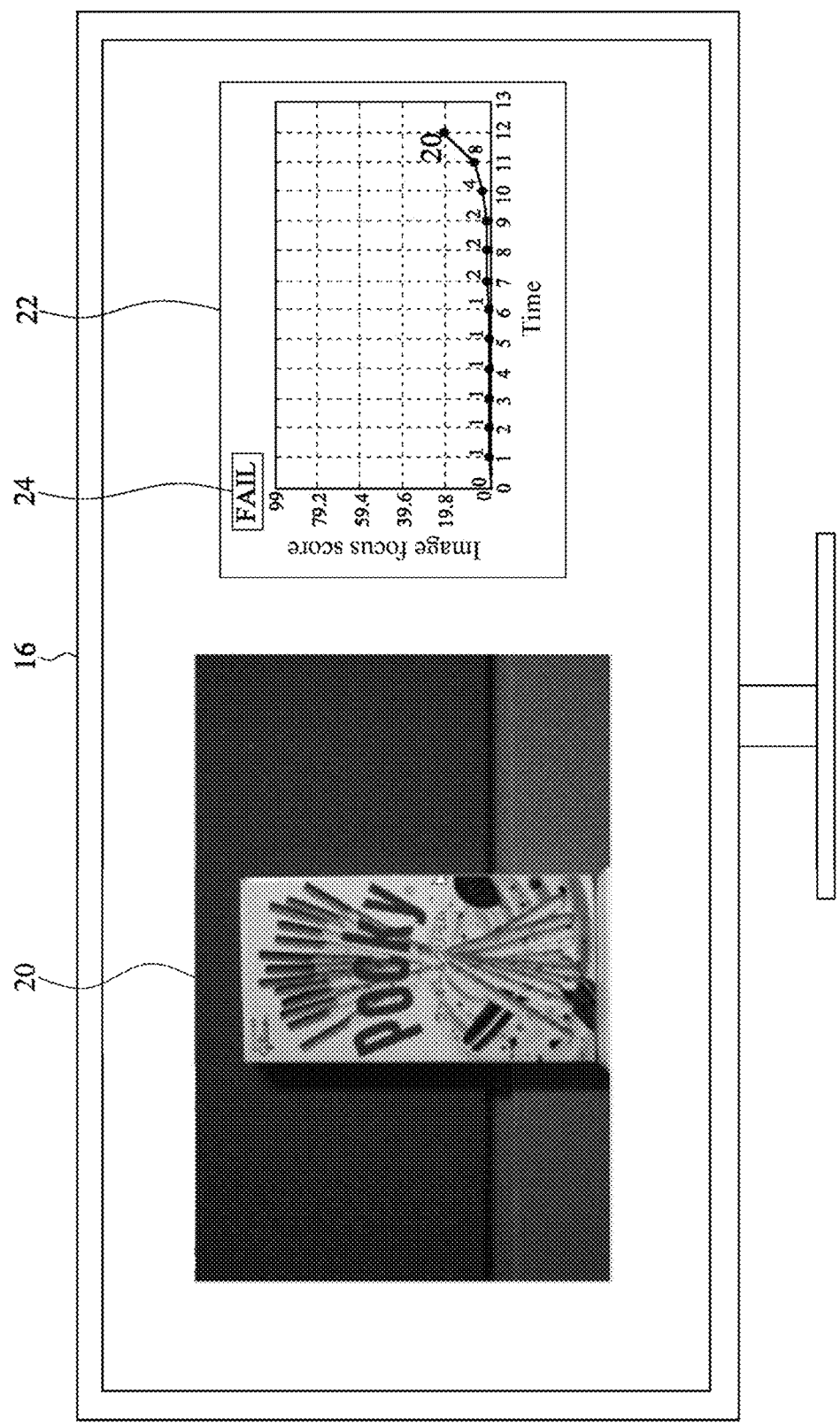
Figure 8C:
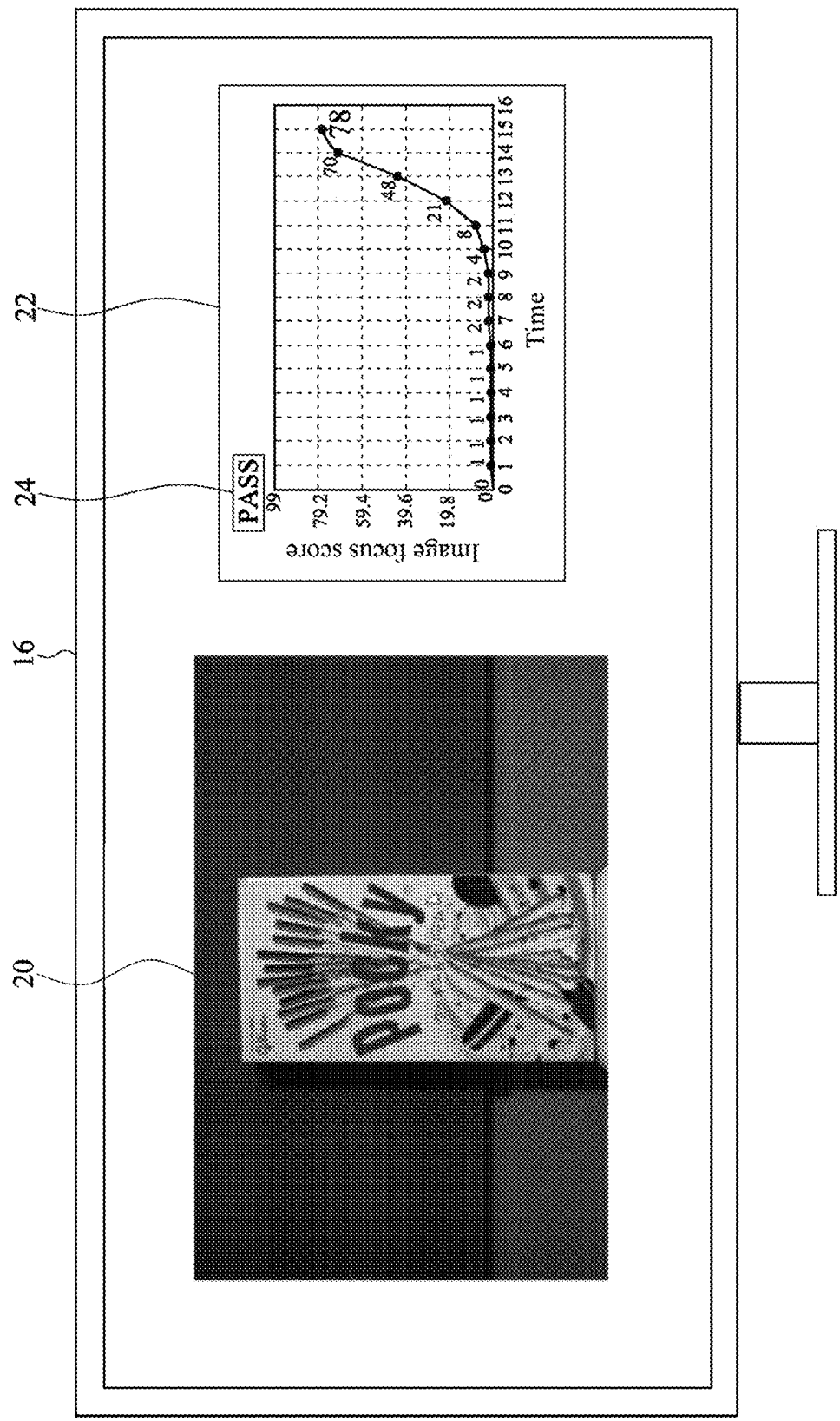
Figure 8D:
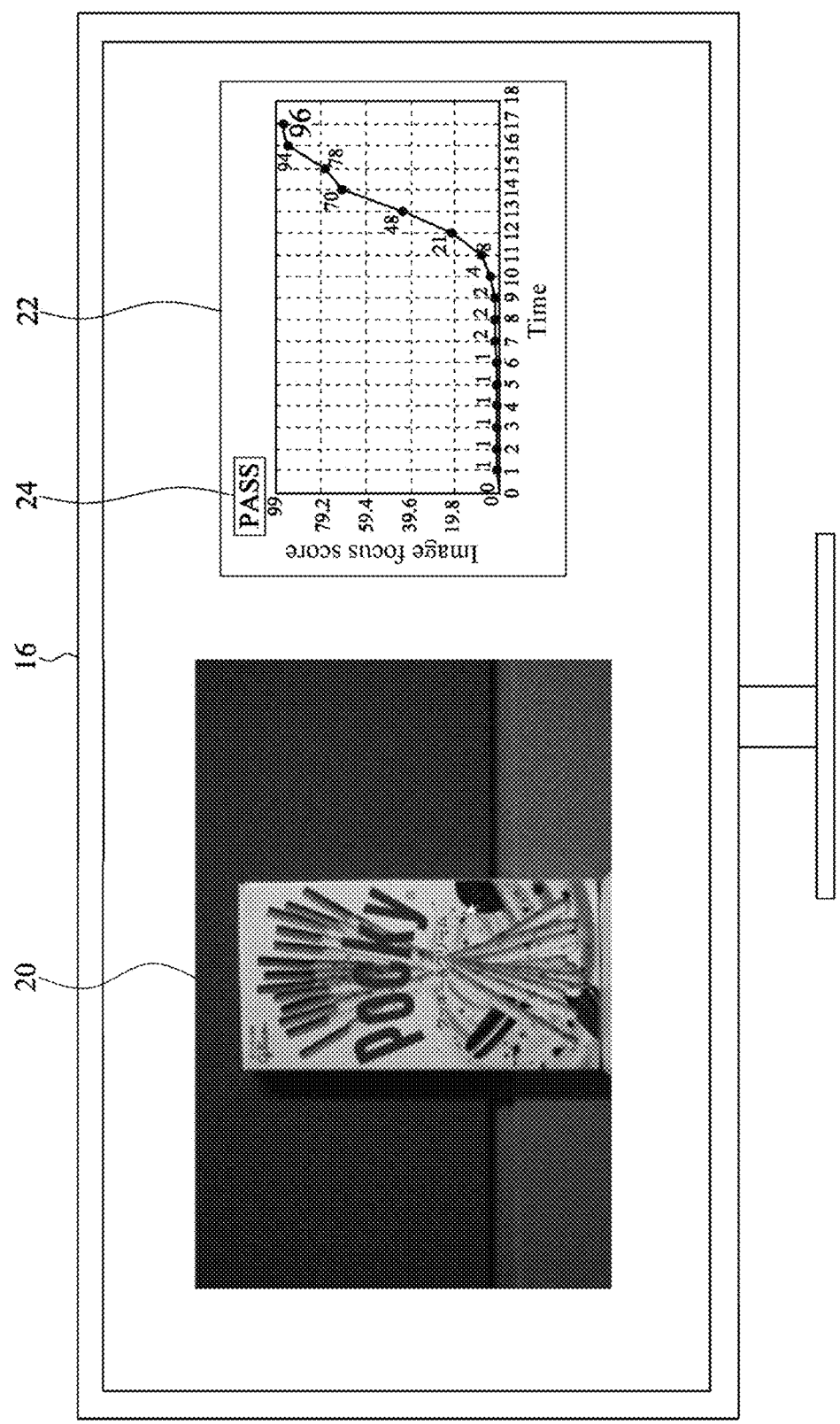
Figure 8E:
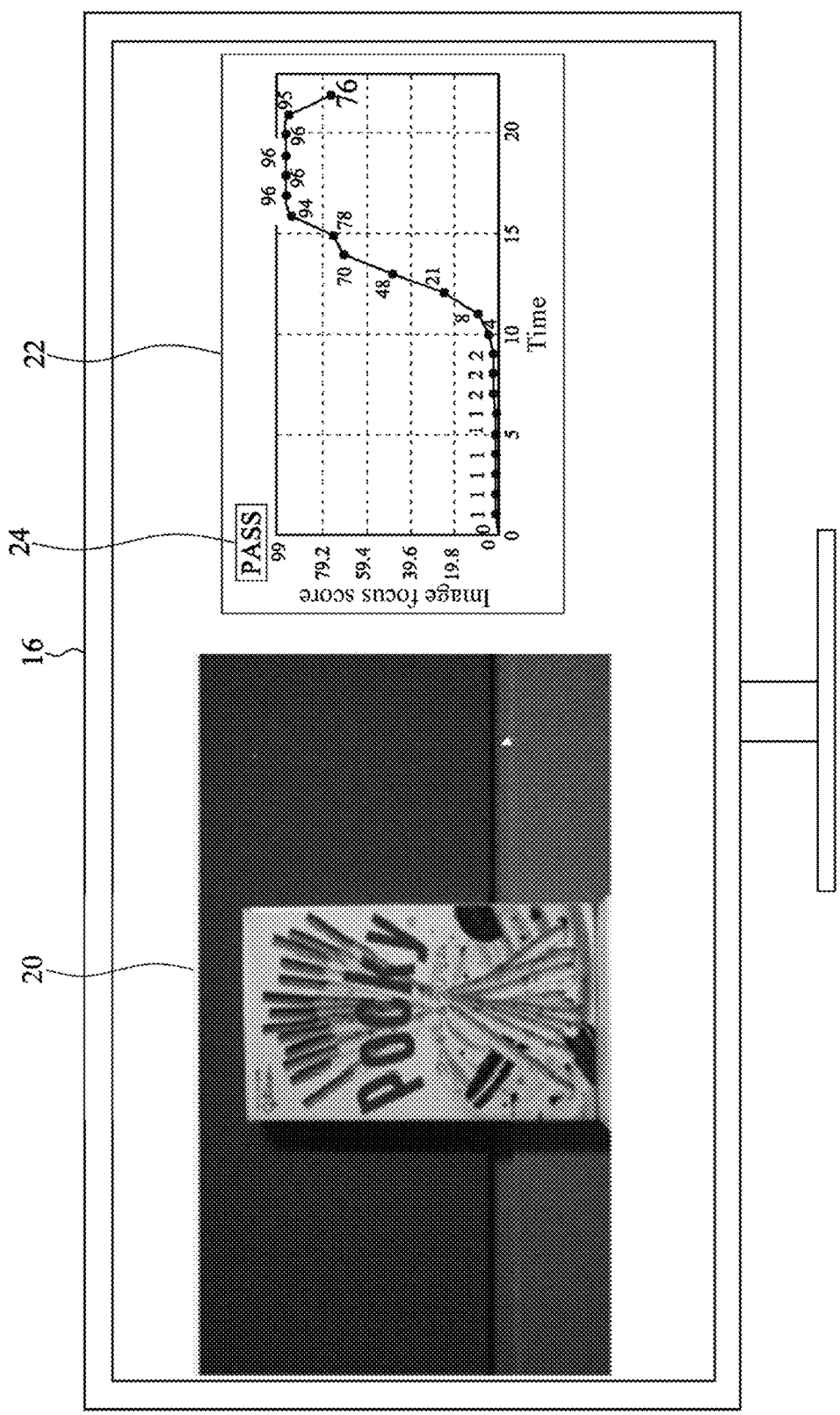
Figure 8F:
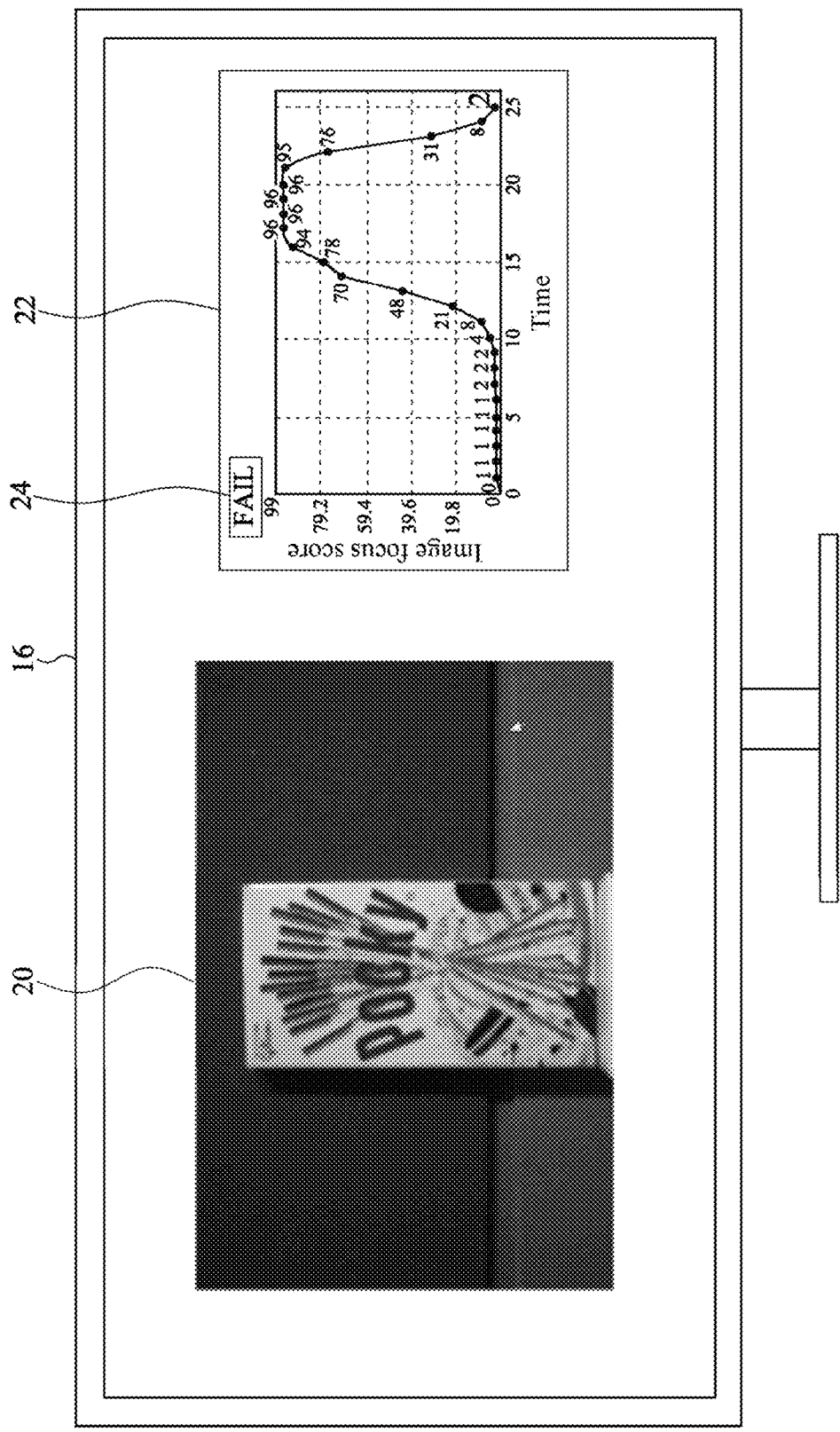

As shown in FIG. 8A, the current streaming image 20 is displayed at the 6th second, and a corresponding image focus score displayed in the historical focus score recording graph 22 is 1. In this case, since the image focus score is lower than the preset standard value, the evaluation result 24 is displayed as FAIL and the image focus score fails to pass the evaluation standard, indicating that the digital camera is in a state of unclear focus adjustment. As shown in FIG. 8B, the current streaming image 20 is displayed at the 12th second, and a corresponding image focus score displayed in the historical focus score recording graph 22 is 20. In this case, since the image focus score is lower than the preset standard value, the evaluation result 24 is displayed as FAIL and the image focus score fails to pass the evaluation standard, indicating that the digital camera is in the state of unclear focus adjustment. As shown in FIG. 8C, the current streaming image 20 is displayed at the 15th second, and a corresponding image focus score displayed in the historical focus score recording graph 22 is 78. In this case, since the image focus score is higher than the preset standard value, the evaluation result 24 is displayed as PASS and the image focus score passes the evaluation standard, indicating that the digital camera is in a state of clear focus adjustment and the current streaming image 20 is for formal detection later. As shown in FIG. 8D, the current streaming image 20 is displayed at the 17th second, and a corresponding image focus score displayed in the historical focus score recording graph 22 is 96. In this case, since the image focus score is higher than the preset standard value, the evaluation result 24 is displayed as PASS and the image focus score passes the evaluation standard, indicating that the digital camera is in the state of clear focus adjustment and the current streaming image 20 is for formal detection later. As shown in FIG. 8E, the current streaming image 20 is displayed at the 22nd second, and a corresponding image focus score displayed in the historical focus score recording graph 22 is 76. In this case, since the image focus score is higher than the preset standard value, the evaluation result 24 is displayed as PASS and the image focus score passes the evaluation standard, indicating that the digital camera is in the state of clear focus adjustment and the current streaming image 20 is for formal detection later. As shown in FIG. 8F, the current streaming image 20 is displayed at the 25th second, and a corresponding image focus score displayed in the historical focus score recording graph 22 is 2. In this case, since the image focus score is lower than the preset standard value, the evaluation result 24 is displayed as FAIL and the image focus score fails to pass the evaluation standard, indicating that the digital camera is in the state of unclear focus adjustment. Based on this, the foregoing examples assist the user in hardware adjustment situations such as parameter adjustment of the digital camera.

Therefore, compared with the target capture of the object to be detected in the related art, in the disclosure, the object detection model of deep learning is used to automatically detect and crop the object to be detected in the picture, and the object to be detected does not need to be placed in a fixed position of the picture in every detection as in the related art. Compared with the subjective evaluation indicators in the related art, in the disclosure, the classification model of deep learning is used to perform evaluation, which has a uniform evaluation standard for focus results and is not affected by human factors. Compared with the objective evaluation indicators in the related art, an edge detection algorithm does not need to be calculated in the disclosure; the object to be detected does not need to be placed in a central position, a target region to be calculated is automatically crop and calculated in the disclosure; and the image does not need to be cropped into multiple partial images for separate evaluation and a statistical mechanism (such as voting or totaling) does not need to be used to obtain a final analysis result.

In conclusion, the image detection auxiliary system and the image detection method provided in the disclosure have the following advantages: In the disclosure, whether a target object to be detected is sufficiently clear is detected in advance, and capture is performed after it is determined that the target object to be detected is in a capture region, to provide an image focus score to assist a determining function of human eyes. Generally, during object detection such as surface defect detection, a surface image of an object to be detected needs to be clearly captured to determine whether the object to be detected is good. The disclosure provides an image focus score for a real-time image to assist a user in adjusting a camera focus parameter, so that a uniform evaluation standard is provided for focus results, to avoid different human evaluation standards. The disclosure assists the user in automatically filtering out an image captured by mistake, such as an image captured by shaking hands and an image with an object that suddenly enters the picture of the camera. In the disclosure, focus quality is evaluated without generating an edge image, which is quite convenient.

The embodiments described above are only used for explaining the technical ideas and characteristics of the disclosure to enable a person skilled in the art to understand and implement the content of the disclosure, and are not intended to limit the patent scope of the disclosure. That is, any equivalent change or modification made according to the spirit disclosed in the disclosure still falls within the patent scope of the disclosure.

What is claimed is:

1. An image detection auxiliary system, comprising:
   an image capture device, capturing at least one object to be detected to generate an original image, wherein before generating the original image, the image capture device further performs an object detection procedure, wherein the object detection procedure comprises:
   detecting whether a target object exists in a picture of the image capture device;
   in a case that the target object exists in the picture of the image capture device, the image capture device generates the original image; and
   in a case that the target object does not exist in the picture of the image capture device, the image capture device generates a first warning signal to display a warning for selecting whether to filter out the picture; and
   a computing device, in signal connection to the image capture device to receive the original image, and preprocessing the original image as an input image, where the computing device uses a classification model of the computing device that is trained with a large quantity of images to obtain a feature parameter corresponding to the input image and inputs the feature parameter to a softmax probability function to calculate an image focus score, and the computing device performs subsequent processing according to the image focus score, wherein in a case that the image focus score is lower than a preset standard value, the computing device generates a second warning signal to warn that the image focus score does not meet a standard, wherein the subsequent processing includes adjusting a focus parameter of the image capture device.

2. The image detection auxiliary system according to claim 1, further comprising a display device, in signal connection to the computing device, and configured to display the input image and the image focus score.

3. The image detection auxiliary system according to claim 1, wherein the step of the computing device preprocessing the original image further comprises:
   cropping a target region from the original image; and
   adjusting a size of the target region as the input image.

4. The image detection auxiliary system according to claim 3, wherein the target region is a central region of the original image.

5. The image detection auxiliary system according to claim 1, wherein the image capture device detects whether the target object exists in the picture through an object detection model.

6. The image detection auxiliary system according to claim 1, wherein in a case that the image focus score reaches a preset standard value, the computing device performs formal detection on the input image.

7. The image detection auxiliary system according to claim 6, wherein the formal detection comprises surface defect detection, image classification processing, or image segmentation processing.

8. An image detection method, comprising:
   capturing at least one object to be detected to generate an original image by an image capture device, wherein before the step of generating the original image, the method further comprises:
   performing an object detection procedure, wherein the object detection procedure comprises:
   detecting whether a target object exists in a picture of the image capture device;
   in a case that the target object exists in the picture of the image capture device, the image capture device generates the original image; and
   in a case that the target object does not exist in the picture of the image capture device, the image capture device generates a first warning signal to display a warning for selecting whether to filter out the picture;
   preprocessing the original image as an input image by a computing device;
   using a classification model of the computing device that is trained with a large quantity of images to obtain a feature parameter corresponding to the input image;
   inputting the feature parameter to a softmax probability function to calculate an image focus score; and performing subsequent processing according to the image focus score, wherein in the step of performing the subsequent processing according to the image focus score, in a case that the image focus score is lower than a preset standard value, generating a second warning signal to warn that the image focus score does not meet a standard, wherein the subsequent processing includes adjusting a focus parameter of the image capture device.

9. The image detection method according to claim 8, wherein the step of preprocessing the original image further comprises:
cropping a target region from the original image; and
adjusting a size of the target region as the input image.

10. The image detection method according to claim 9, wherein the target region is a central region of the original image.

11. The image detection method according to claim 8, wherein the image capture device detects whether the target object exists in the picture through an object detection model.

12. The image detection method according to claim 8, wherein in the step of performing the subsequent processing according to the image focus score, in a case that the image focus score reaches a preset standard value, the subsequent processing comprises: performing formal detection on the input image.

13. The image detection method according to claim 12, wherein the formal detection comprises surface defect detection, image classification processing, or image segmentation processing.

\* \* \* \* \*